United States Patent
Craft, Jr. et al.

(10) Patent No.: US 8,236,457 B2
(45) Date of Patent: Aug. 7, 2012

(54) ELECTRONICS CABINET WITH WASTE WATER MANAGEMENT SYSTEM FOR BACKUP POWER FUEL CELL

(75) Inventors: Thomas F. Craft, Jr., Murphy, TX (US); Anil K. Trehan, Plano, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 573 days.

(21) Appl. No.: 12/416,116

(22) Filed: Mar. 31, 2009

(65) Prior Publication Data

US 2009/0246577 A1 Oct. 1, 2009

Related U.S. Application Data

(60) Provisional application No. 61/041,575, filed on Apr. 1, 2008, provisional application No. 61/047,016, filed on Apr. 22, 2008, provisional application No. 61/047,031, filed on Apr. 22, 2008.

(51) Int. Cl.
 *H01M 8/06* (2006.01)
(52) U.S. Cl. ...................................... 429/414
(58) Field of Classification Search .......... 429/414–416, 429/450, 483, 514, 535, 436, 425–426
See application file for complete search history.

(56) References Cited

U.S. PATENT DOCUMENTS

| | | |
|---|---|---|
| 3,523,830 A | 8/1970 | Baker et al. |
| 4,782,669 A | 11/1988 | Trocciola et al. |
| 5,200,278 A | 4/1993 | Watkins et al. |
| 5,314,762 A | 5/1994 | Hamada et al. |
| 5,316,869 A | 5/1994 | Perry et al. |
| 5,616,431 A | 4/1997 | Kusunoki et al. |
| 6,087,028 A | 7/2000 | Goto |
| 6,232,006 B1 | 5/2001 | Breault |
| 6,673,482 B2 | 1/2004 | Imazeki et al. |
| 6,885,112 B2 | 4/2005 | Johnson |
| 6,916,566 B2 | 7/2005 | Saloka et al. |
| 7,005,206 B2 | 2/2006 | Lawrence et al. |
| 7,100,385 B2 | 9/2006 | Craft, Jr. et al. |
| 7,205,062 B2 | 4/2007 | Tawfik et al. |
| 7,264,895 B2 | 9/2007 | White |
| 7,316,855 B2 | 1/2008 | Lawrence et al. |
| 7,602,073 B2 | 10/2009 | Meyers et al. |
| 2001/0049039 A1* | 12/2001 | Haltiner, Jr. .................. 429/24 |
| 2002/0037447 A1 | 3/2002 | Imaseki et al. |
| 2002/0119354 A1* | 8/2002 | O'Brien et al. ................ 429/20 |
| 2003/0031904 A1* | 2/2003 | Haltiner, Jr. .................. 429/26 |
| 2003/0039872 A1 | 2/2003 | Grasso et al. |
| 2003/0039873 A1 | 2/2003 | Condit et al. |
| 2003/0087139 A1 | 5/2003 | White |
| 2003/0170528 A1* | 9/2003 | Simpson et al. ............... 429/38 |
| 2004/0053104 A1 | 3/2004 | Novkov et al. |

(Continued)

FOREIGN PATENT DOCUMENTS

EP 1 187 242 3/2002

(Continued)

*Primary Examiner* — Jean F Duverne

(74) *Attorney, Agent, or Firm* — Muncy, Geissler, Olds & Lowe, PLLC

(57) ABSTRACT

A waste water management system for a fuel cell cabinet is provided. The waste water management system includes a sealed device that collects and manages the flow of the water from a fuel cell. The sealed device manages a flow of the water from the fuel cell to one of a container and an exterior of the fuel cell cabinet.

34 Claims, 16 Drawing Sheets

U.S. PATENT DOCUMENTS

| | | |
|---|---|---|
| 2004/0146761 A1 | 7/2004 | Cargnelli et al. |
| 2004/0161657 A1 | 8/2004 | Simpson et al. |
| 2005/0074644 A1 | 4/2005 | Ueda et al. |
| 2005/0091922 A1 | 5/2005 | Goebel et al. |
| 2005/0129990 A1 | 6/2005 | Ozeki et al. |
| 2005/0262818 A1 | 12/2005 | Stenersen |
| 2006/0078777 A1 | 4/2006 | Grimes et al. |
| 2006/0105209 A1 | 5/2006 | Thyroff et al. |
| 2006/0151156 A1 | 7/2006 | Valensa et al. |
| 2006/0166056 A1 | 7/2006 | Nakamura et al. |
| 2006/0199064 A1 | 9/2006 | Arnold et al. |
| 2006/0204412 A1 | 9/2006 | Rizzo et al. |
| 2006/0246328 A1 | 11/2006 | Willets et al. |
| 2007/0059583 A1 | 3/2007 | Vinsant |
| 2007/0275281 A1 | 11/2007 | White |
| 2008/0038610 A1* | 2/2008 | Darling .......................... 429/26 |
| 2008/0138671 A1 | 6/2008 | Kolodziej et al. |
| 2008/0268300 A1* | 10/2008 | Pfefferle .......................... 429/17 |
| 2009/0035616 A1 | 2/2009 | Darling et al. |
| 2009/0123797 A1 | 5/2009 | Kaye et al. |
| 2010/0167147 A1* | 7/2010 | Irvine et al. .................. 429/434 |
| 2010/0221642 A1* | 9/2010 | Frahm et al. .................. 429/512 |
| 2011/0039177 A1 | 2/2011 | Yamaga et al. |

FOREIGN PATENT DOCUMENTS

| | | |
|---|---|---|
| WO | WO 2008/016257 | 2/2008 |

* cited by examiner

ELECTRONICS CABINET WITH WASTE WATER MANAGEMENT SYSTEM FOR BACKUP POWER FUEL CELL

CLAIM OF PRIORITY UNDER 35 U.S.C. §119

The present invention claims the benefit of Provisional Application No. 61/041,575 entitled "Liquid Cooling System for Fuel Cell Cabinets, Air Feed System for Fuel Cell Cabinets, Heat Management and Thermal Control of Cabinets for Fuel Cells, and EcoPower Cabinet" filed Apr. 1, 2008, Provisional Application No. 61/047,016 entitled "Cabinet Air Feed and Exhaust System for Hydrogen Fuel Cell Declassification" filed Apr. 22, 2008, and Provisional Application No. 61/047,031 entitled "Fuel Cell Cabinet Waste Water Management System" filed Apr. 22, 2008, the entire contents of which are hereby incorporated by reference.

REFERENCE TO CO-PENDING APPLICATIONS FOR PATENT

The present application for patent is related to the following co-pending U.S. patent applications:

"ELECTRONICS CABINET WITH LIQUID COOLING SYSTEM FOR BACKUP POWER FUEL CELL" (U.S. application Ser. No. 12/416,087), filed Mar. 31, 2009, assigned to the assignee hereof, and the entire contents of which are hereby incorporated by reference;

"ELECTRONICS CABINET WITH AIR FEED SYSTEM FOR BACKUP POWER FUEL CELL" (U.S. application Ser. No. 12/416,096), filed Mar. 31, 2009, assigned to the assignee hereof, and the entire contents of which are hereby incorporated by reference;

"ELECTRONICS CABINET WITH HEAT MANAGEMENT AND THERMAL CONTROL SYSTEM FOR BACKUP POWER FUEL CELL" (U.S. application Ser. No. 12/416,106), filed Mar. 31, 2009, assigned to the assignee hereof, and the entire contents of which are hereby incorporated by reference; and "ELECTRONICS CABINET WITH AIR FEED AND EXHAUST SYSTEM FOR BACKUP POWER FUEL CELL" (U.S. application Ser. No. 12/416,113), filed Mar. 31, 2009, assigned to the assignee hereof, and the entire contents of which are hereby incorporated by reference.

FIELD OF THE INVENTION

The present invention is directed toward cabinets for housing electronic equipment. More particularly, the present invention relates to a cabinet for housing electronic equipment and a connection panel for cross-connecting the electronic equipment with various provider and/or subscriber lines, wherein the cabinet includes a fuel cell power backup system, and more particularly, to a fuel cell cabinet having a waste water management system.

BACKGROUND OF THE INVENTION

Outdoor cabinets that house electronic equipment and connection panels are generally known in the art. The connection panel (sometimes referred to as a feeder-distribution interface), within the cabinet, is used to connect subscriber lines to provider lines directly, or in parallel or serial, with terminals of certain electronic equipment also within the cabinet, such as surge protectors, switches, servers, etc.

In some conventional cabinets, the electronic equipment includes a fuel cell power backup system. A fuel cell, such as a hydrogen fuel cell, combines hydrogen fuel and oxygen from the air to generate electricity. As a result of the combination of the hydrogen fuel and the oxygen, water flows from the fuel cell. Therefore, the water flow needs to be managed, for example, to prevent damage to the fuel cell cabinet system and/or electronic equipment.

Some conventional fuel cell cabinets commonly drain the water on the surface of ground (i.e., above grade), which may cause water damage to the cabinet, such as the base of the fuel cell cabinet, or the surroundings of the fuel cell cabinet, such as the surface on which the cabinet is mounted. Additionally, the draining water can sit above grade, which may be visibly unpleasant to a user. The water sitting above grade may result in wet or muddy ground conditions, or which may freeze on the ground in colder environments.

Some other conventional fuel cell cabinets commonly capture and store the water, for example in a container or bucket, for subsequent removal by a services technician or company. These conventional approaches may result in increased costs associated with maintaining the system, such as the cost of removal of the captured water. Additionally, these conventional approaches may require timely service to prevent overflowing of the container or bucket used to capture the water, which may add to the complexity of operating and managing the system. Further, the container or bucket takes up space within the fuel cell cabinet or results in an increased size requirement for the fuel cell cabinet.

SUMMARY OF THE INVENTION

These problems and others are addressed by the present invention, a first aspect of which comprises a fuel cell cabinet including a waste water management system for a fuel cell, wherein the waste water management system manages a flow of water from the fuel cell to one of a container and an exterior of the fuel cell cabinet.

Another aspect of the invention comprises a fuel cell cabinet waste water management system including a sealed device that collects and manages the flow of the water from a fuel cell, wherein the sealed device manages a flow of the water from the fuel cell to one of a container and an exterior of the fuel cell cabinet.

Another aspect of the invention comprises a fuel cell cabinet waste water management system including a fuel cell arranged in or on a fuel cell cabinet, and a sealed device that collects and manages the flow of the water from the fuel cell, wherein the sealed device manages a flow of the water from the fuel cell to one of a container and an exterior of the fuel cell cabinet.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

Figure 1:
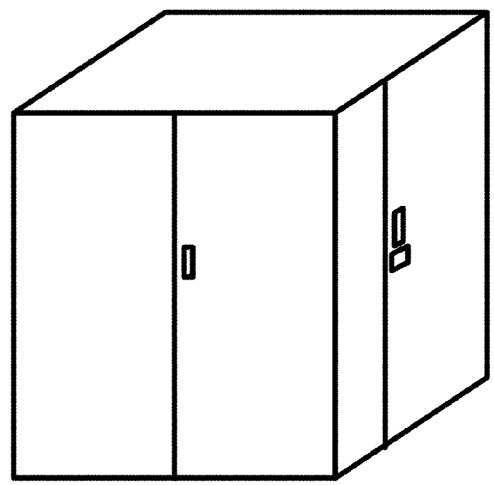
FIG. 1 is a perspective view of a cabinet, according to an embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

To solve the aforementioned problems with the conventional systems, the exemplary aspects can provide a fuel cell waste water management system that reduces or prevents water damage to the fuel cell cabinet, such as the base of the fuel cell cabinet, or the surroundings of the fuel cell cabinet, such as the surface on which the cabinet is mounted. The aspects also can reduce or eliminate water lying on the surface adjacent to the fuel cell cabinet, which otherwise may be visibly unpleasant to a user, may result in wet or muddy conditions, or may freeze on the ground in colder environments.

The exemplary aspects also can reduce or eliminate the need to remove captured water from the fuel cell cabinet, thereby reducing the maintenance costs and the complexity associated with the operation and management of the fuel cell cabinet. In these aspects, a container or bucket is not needed to capture the water, and therefore may further reduce costs.

The exemplary aspects also can extend the life of the fuel cell cabinet and the systems within the fuel cell cabinet by reducing or preventing water damage to the system, and properly removing water flowing from the fuel cells, thereby extending the life of the fuel cell system and fuel cell cabinet.

The exemplary aspects also can improve or maximize the use of the space in the interior of the fuel cell cabinet or reduce the cabinet size compared with conventional systems such that the size of the foot print required for the fuel cell cabinet is reduced. Exemplary aspects also can provide a system that is not limited by outdoor exposure temperatures and can operate in extreme cold or hot climates. The exemplary aspects also can utilize a standard telecom cabinet, thereby increasing a comfort level of a user of the cabinet.

The exemplary aspects also recognize that the water from the fuel cells is clean, pure water. The exemplary aspects can provide a waste water management system that recycles the clean, pure water from the fuel cells back into the surrounding environment. Other aspects can collect or store the clean, pure water from the fuel cells for other uses.

Exemplary aspects will now be described with reference to FIGS. 1-15.

Figure 2:
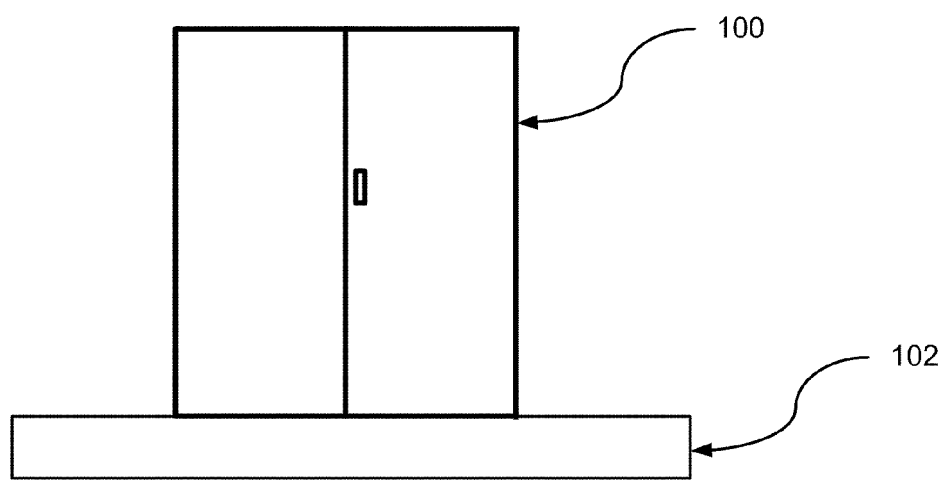
FIG. 2 is a plan view of a cabinet, according to an embodiment of the invention.

A fuel cell cabinet 100 according to an exemplary aspect is illustrated in FIGS. 1 and 2. The fuel cell cabinet 100 may house electronic equipment and a connection panel for cross-connecting the electronic equipment with various provider and/or subscriber lines. The fuel cell cabinet 100 includes a fuel cell power backup system. As shown in FIG. 2, the fuel cell cabinet 100 can be mounted on the surface of, for example, a concrete pad 102. The surface upon which the fuel cell cabinet 100 can be mounted is not limited to a concrete pad 102 and can include any suitable surface, device, or structure, such as a pad or mounting surface formed from fiberglass, plastic, metal, etc. Aspects of the fuel cell cabinet 100 can be mounted in the interior of buildings, structures, etc., or at the exterior of buildings, structures, etc. For example, an aspect of a fuel cell cabinet 100 can be mounted on a rack or shelter or other structure (not shown).

Figure 3A:
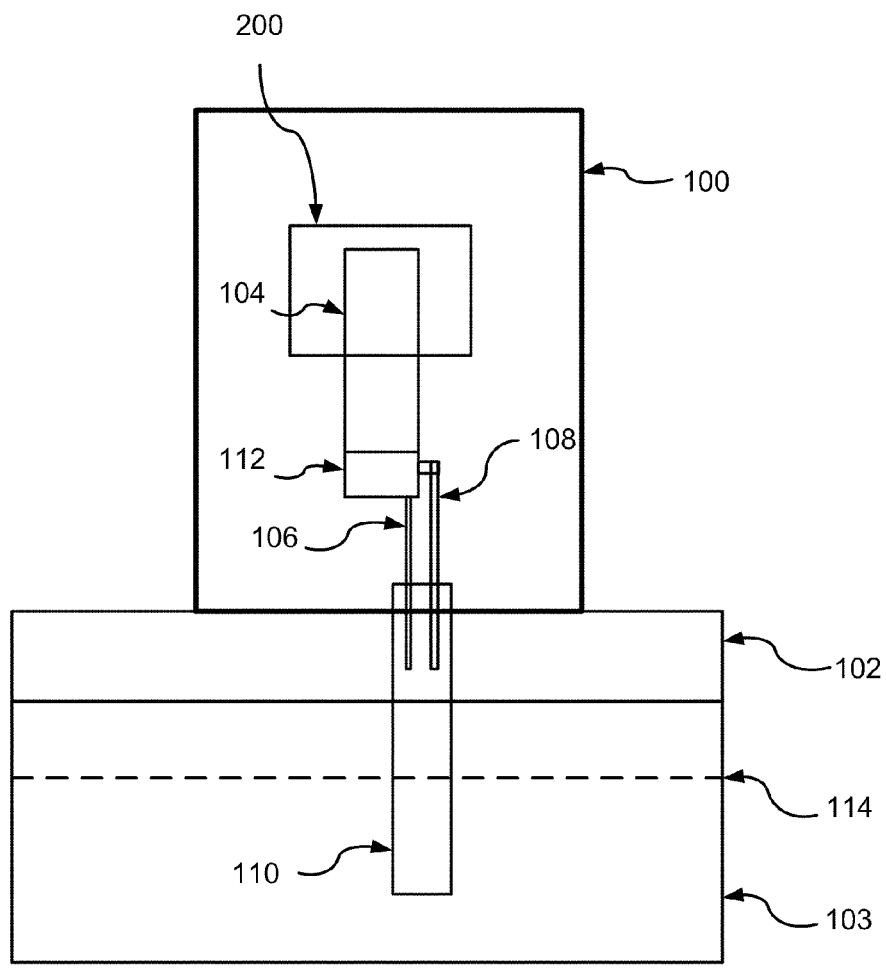
FIG. 3A is a schematic of a cabinet, according to an embodiment of the invention.
Figure 3B:
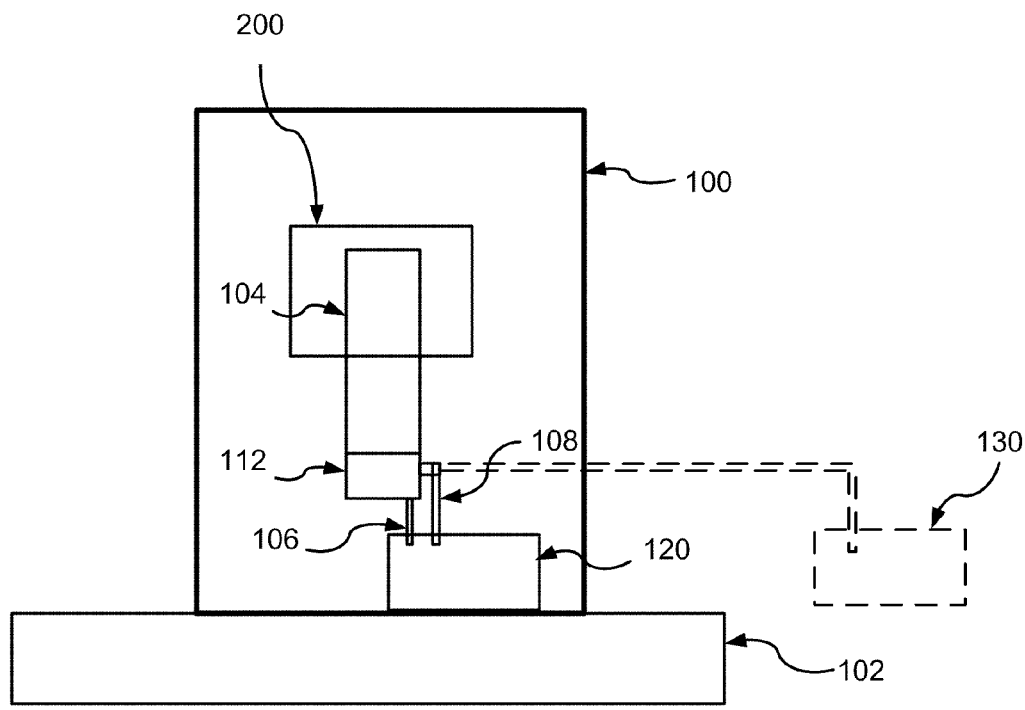
FIG. 3B is a schematic of a cabinet, according to an embodiment of the invention.
Figure 4A:
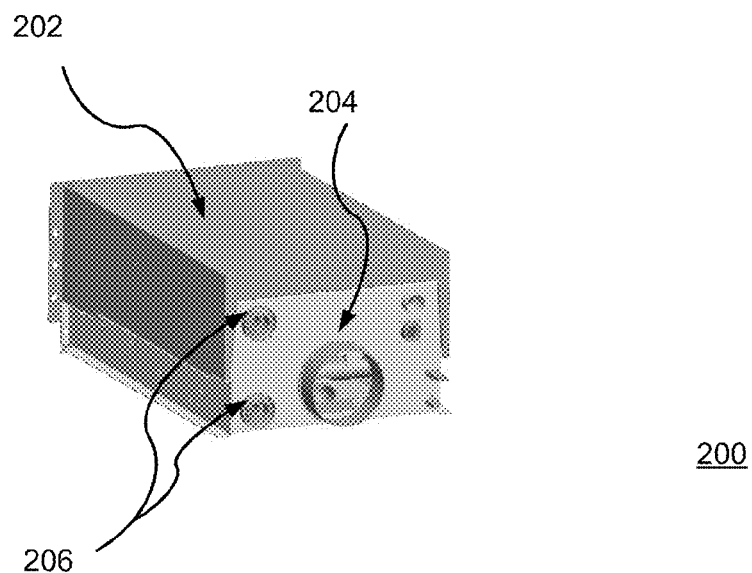
FIGS. 4A and 4B are perspective views of the fuel cell assembly, according to an embodiment of the invention.
Figure 4B:
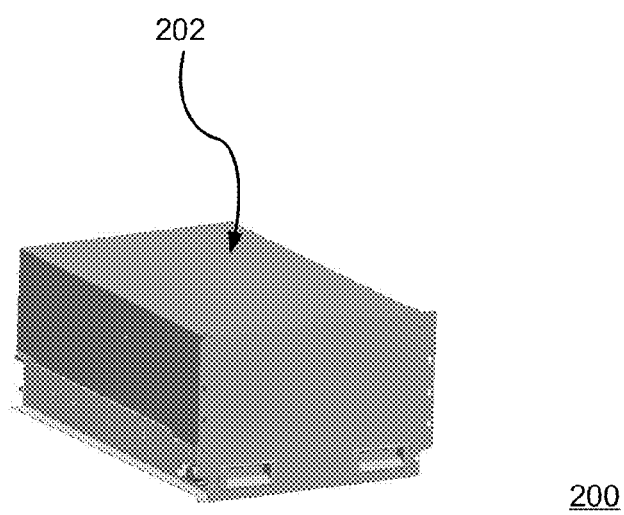
Figure 5A:
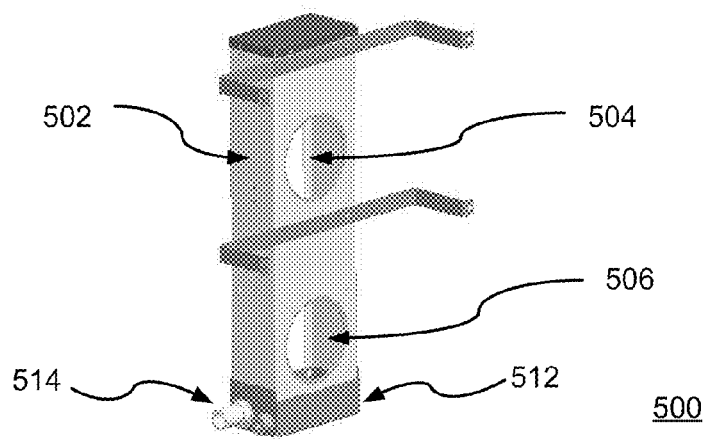
FIGS. 5A-5C are perspective views of a plenum, according to an embodiment of the invention.
Figure 5B:
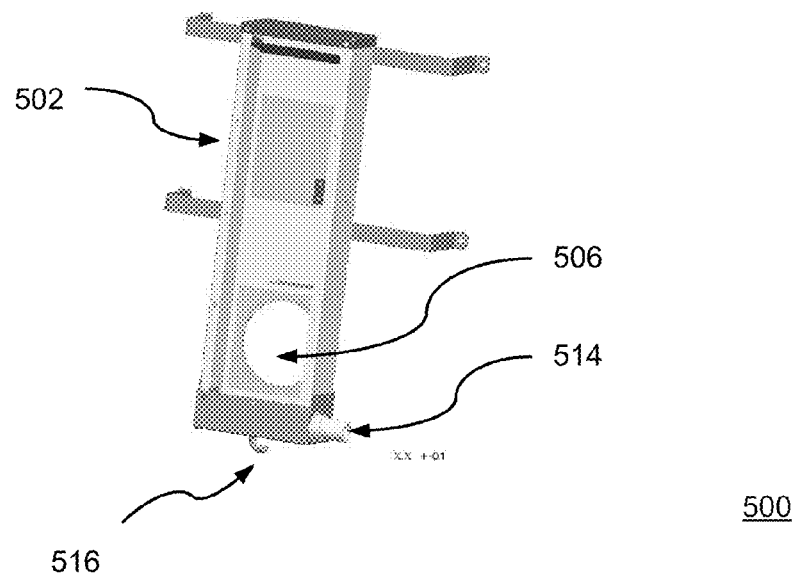
Figure 5C:
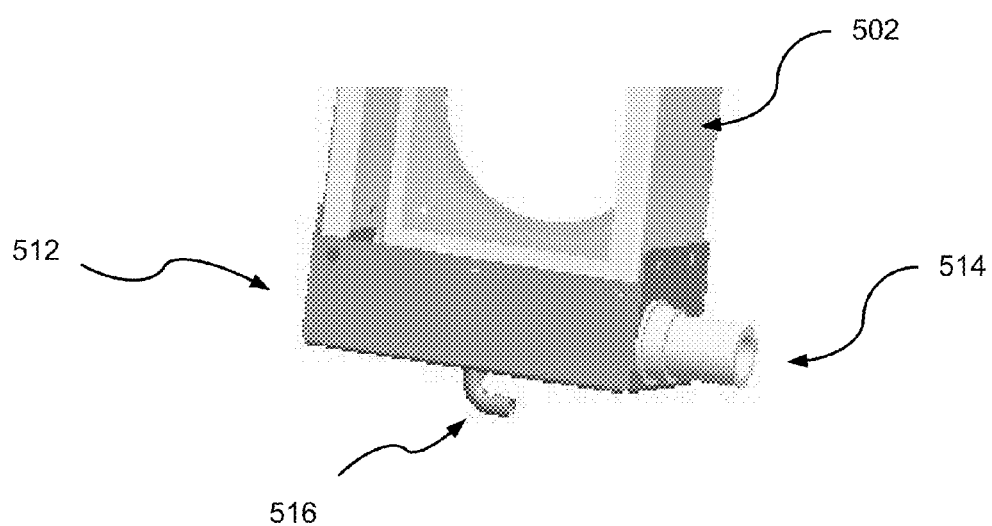

With reference to FIGS. 3A and 3B, exemplary aspects of a waste water management system will now be described. The fuel cell cabinet 100 can include one or more fuel cells 200 that generate electricity and produce clean, pure water. A plenum 104 can be sealed against the enclosures of the one or more fuel cells 200. The plenum 104 can include a sealed base 112 that captures the water from the one or more fuel cells 200 during operation.

A sealed drain fitting can be provided on the side of the plenum 104 to interface the plenum 104 to a drain hose 108. In other aspects, a sealed drain fitting can be provided on the bottom of the plenum 104 to interface the plenum 104 to the drain hose 106. The drain hose 106, 108 can be, for example, at least a ½ inch diameter hose. In an aspect, the drain hose 106, 108 can be insulated to maintain a higher temperature of the water in the hose to reduce or prevent freezing in cold climates. In another aspect, the drain hose 106, 108 can be heated to resist freezing in cold climates. In this aspect, a heater can be attached to the drain hose, or a fan can supply heated air over the drain hose to resist freezing.

In an exemplary aspect in which the waste water management system is configured for exterior use, the waste water management system can include a drain pipe 110 that extends through the mounting surface, such as a concrete pad 102, and into the gravel 103, as shown in FIG. 3A. The drain pipe 110 can be configured to extend below the frost line 114 in cold climates. The drain pipe 110 can be any suitable drain pipe, such as a PCV drain pipe, a perforated PVC drain pipe, or the like. In other aspects, the drain pipe 110 can be heated to resist freezing in cold climates. In this aspect, a heater can be attached to the drain pipe 110, or a fan can supply heated air into the drain pipe 110 to resist freezing. As described in more detail below, other aspects of the waste water management system can collect, store, or supply the clean, pure water from the fuel cells to a device, for example, for other uses, as shown in FIG. 3B.

An exemplary aspect of a fuel cell 200 and plenum 500, which can be mounted or secured in the exemplary cabinet 100, will be described with reference to FIGS. 4A and 4B, and FIGS. 5A to 5C.

The fuel cell 200 can include a sealed fuel cell enclosure 202. The fuel cell enclosure 202 can include liquid feed interface fittings 206 for permitting a cooling liquid to enter and exit the fuel cell 200. The fuel cell 200 can be a liquid cooled hydrogen fuel cell based on exchange membrane (PEM) technology. The fuel cell 200 can be, for example, an 8 kW fuel cell. In an aspect, two 8 kW fuel cells 200 can be used to provide a 16 kW fuel cell system.

The plenum 500 can include a casing 502 having intakes 504, 506 that seal against a plenum sealing collar 204 of the fuel cells 200. The casing 502 can be sealed against an inside surface of a door of the cabinet 100. The plenum 500 can include a sealed base 512 that captures the water from the one or more fuel cells 200 during operation. A sealed drain fitting 514 can be provided on the side of the plenum 500 to interface the plenum to a drain hose (e.g., drain hose 108 in FIG. 3). in other aspects, a sealed drain fitting 516 can be provided on the bottom of the plenum 500 to interface the plenum to a drain hose (e.g., drain hose 106).

An exemplary fuel cell cabinet having a waste water management system according to an exemplary aspect will now be described with reference to FIGS. 6-10.

Figure 6:
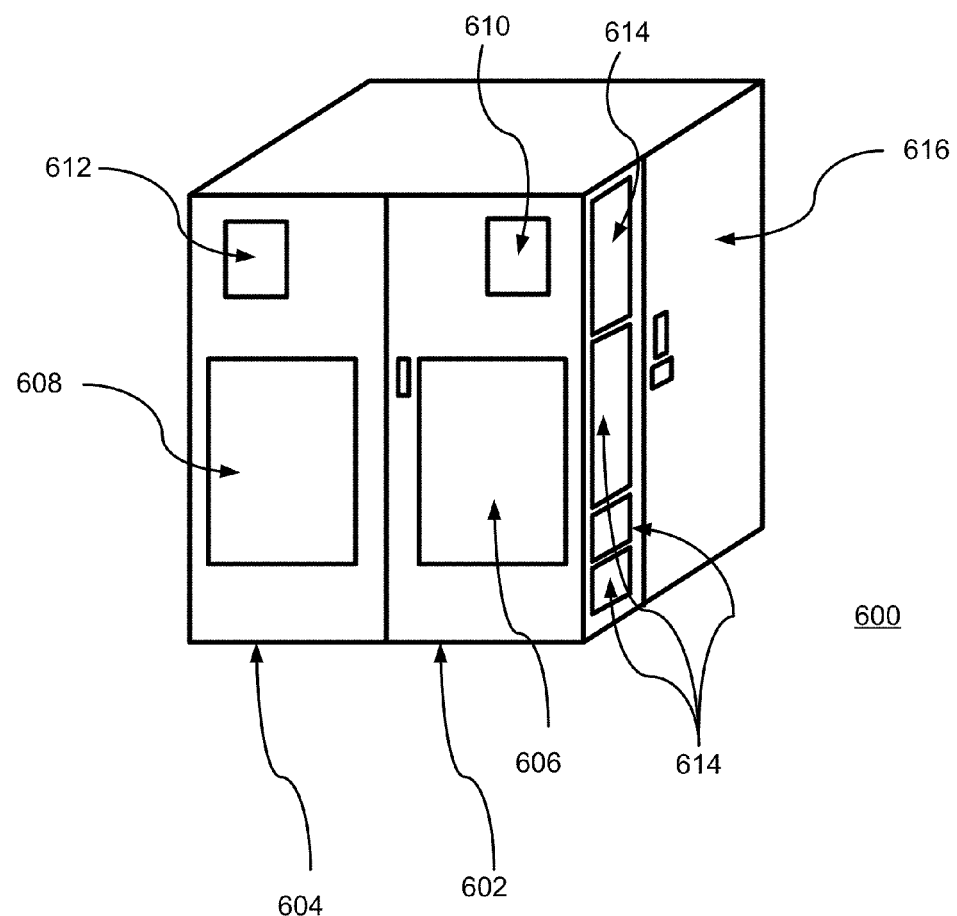
FIG. 6 is a perspective view of a cabinet, according to an embodiment of the invention.

FIG. 6 shows an aspect of a fuel cell cabinet 600 having one or more fuel cells, a liquid cooling system, an air feed system, an exhaust system for hydrogen declassification, and a waste water management system. The fuel cell cabinet 600 can include four sides, a top, and a bottom. The fuel cell cabinet 600 can include one or more doors 602, 604 on a first side of the cabinet 600. The cabinet 600 can include one or more doors 616 on a second side of the cabinet 600 and one or more doors 640 on a third side of the cabinet 600. The fuel cell cabinet 600 also may include one or more doors on the fourth side of the cabinet 600, which are not shown. The doors 602, 604 can include air inlet and door perforations 606, 608, 610, and 612. The fuel cell cabinet 600 can include air exits 614 on one or more sides, such as the second side and the third side.

Figure 7:
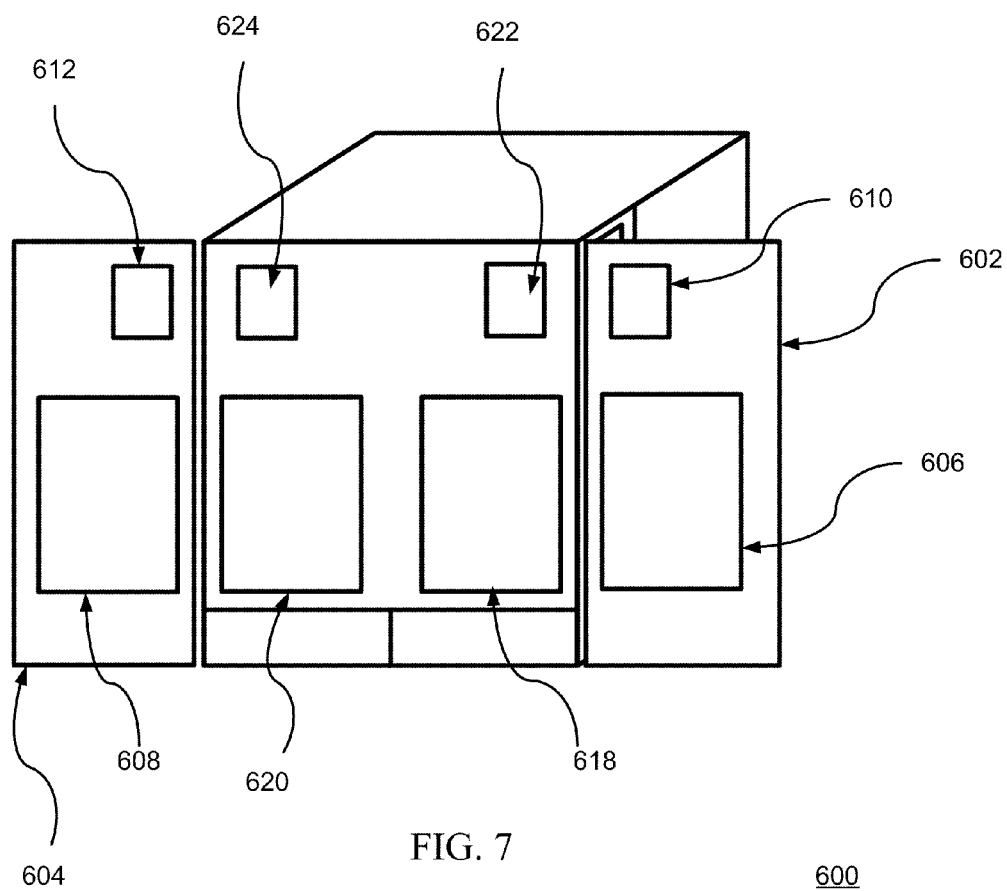
FIG. 7 is another perspective view of the cabinet of FIG. 6.

FIG. 7 shows an aspect of the fuel cell cabinet 600 of FIG. 6 with the doors 602, 604 in an open position. The cabinet 600 can include one or more air filters 622, 624 that cooperate with the air inlets and door perforations 610, 612 of the doors 602, 604. The ambient air from the exterior of the cabinet 600 is drawn through the air filters 622, 624 into the air feed system. The cabinet 600 also may include one or more fan and liquid-to-air heat exchanger assemblies (Fan/L-A Hex assemblies) 618, 620 (e.g., radiator fans and radiators) that cooperate with the air inlets and door perforations 606, 608 of the doors 602, 604.

Figure 8:
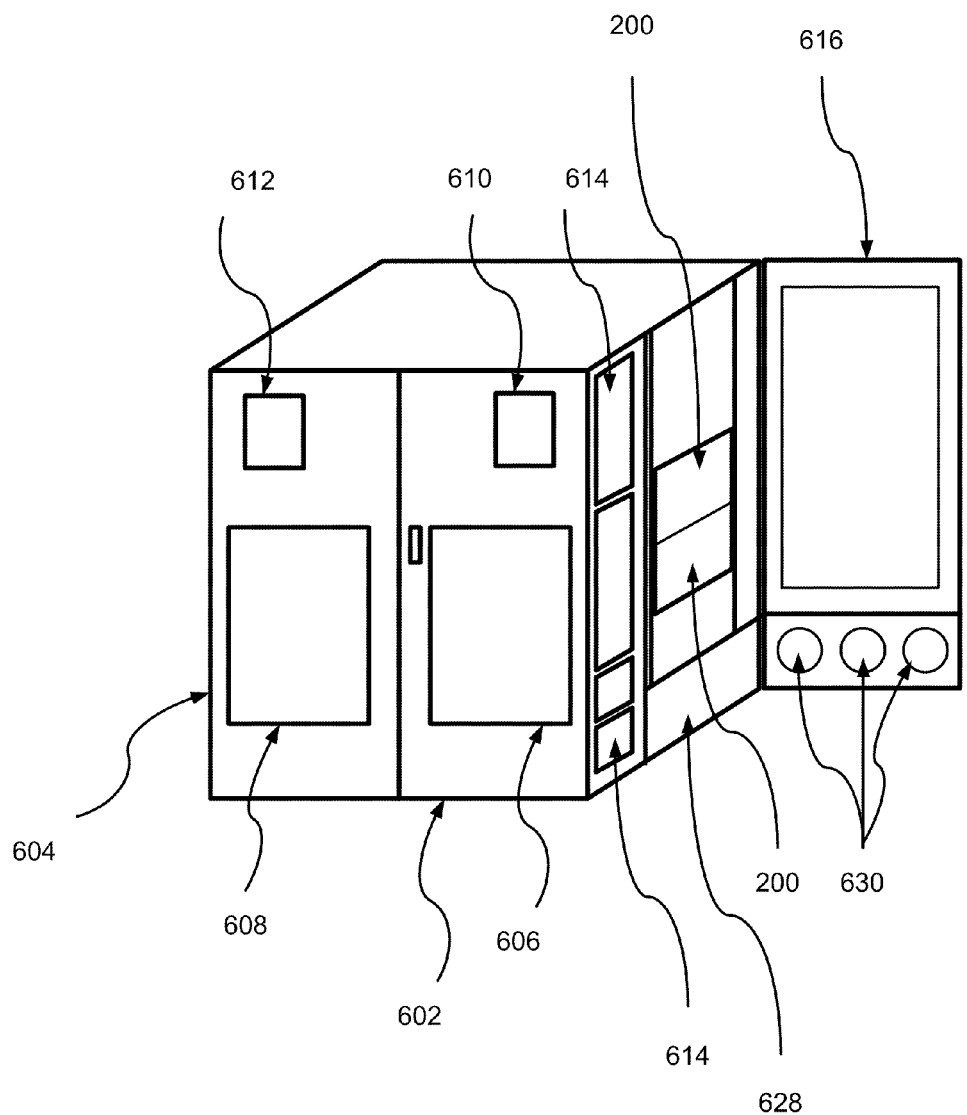
FIG. 8 is another perspective view of the cabinet of FIG. 6.

FIG. 8 shows an aspect of the fuel cell cabinet 600 of FIG. 6 with the door 616 in an open position. The cabinet 600 can include one or more fuel cells 200 disposed and mounted in the interior of the cabinet 600. The cabinet may include a rack or shelving system for mounting or securing the fuel cells 200 inside the cabinet 600. The cabinet 600 can include a battery compartment 628 for mounting or securing backup batteries. The door 616 may include a fan system 630 including one or more fans for venting or exhausting air or gases from the battery compartment 628.

Figure 9:
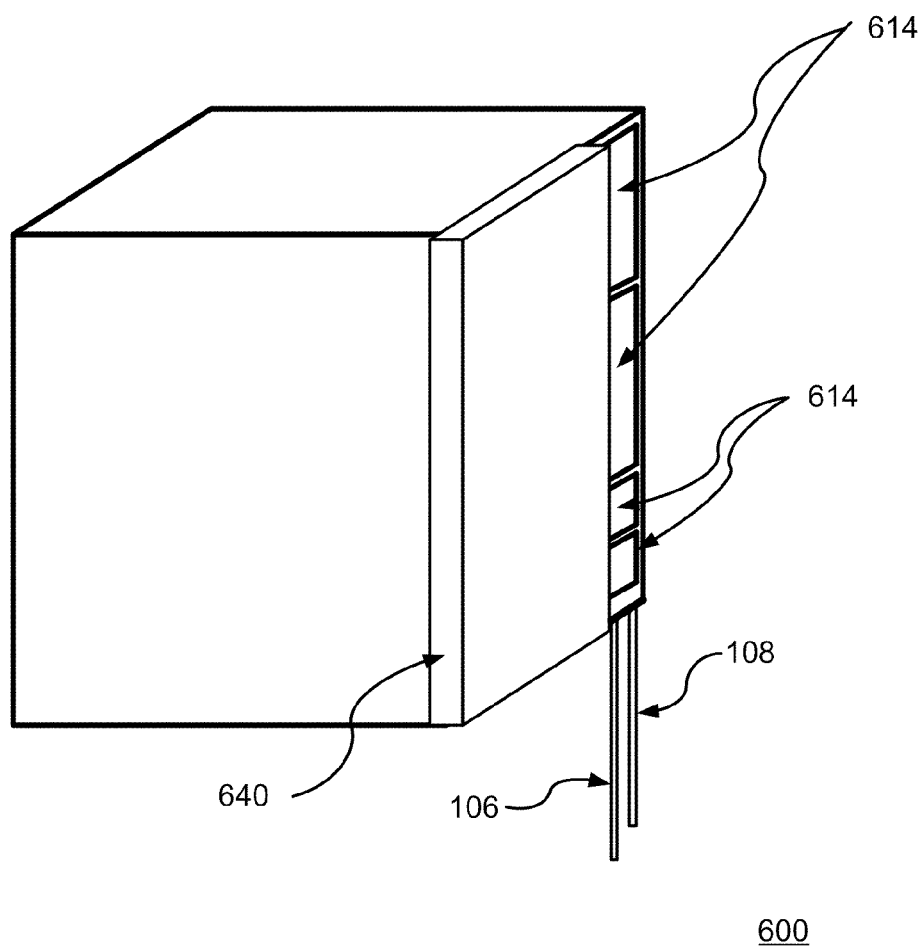
FIG. 9 is another perspective view of the cabinet of FIG. 6.
Figure 10:
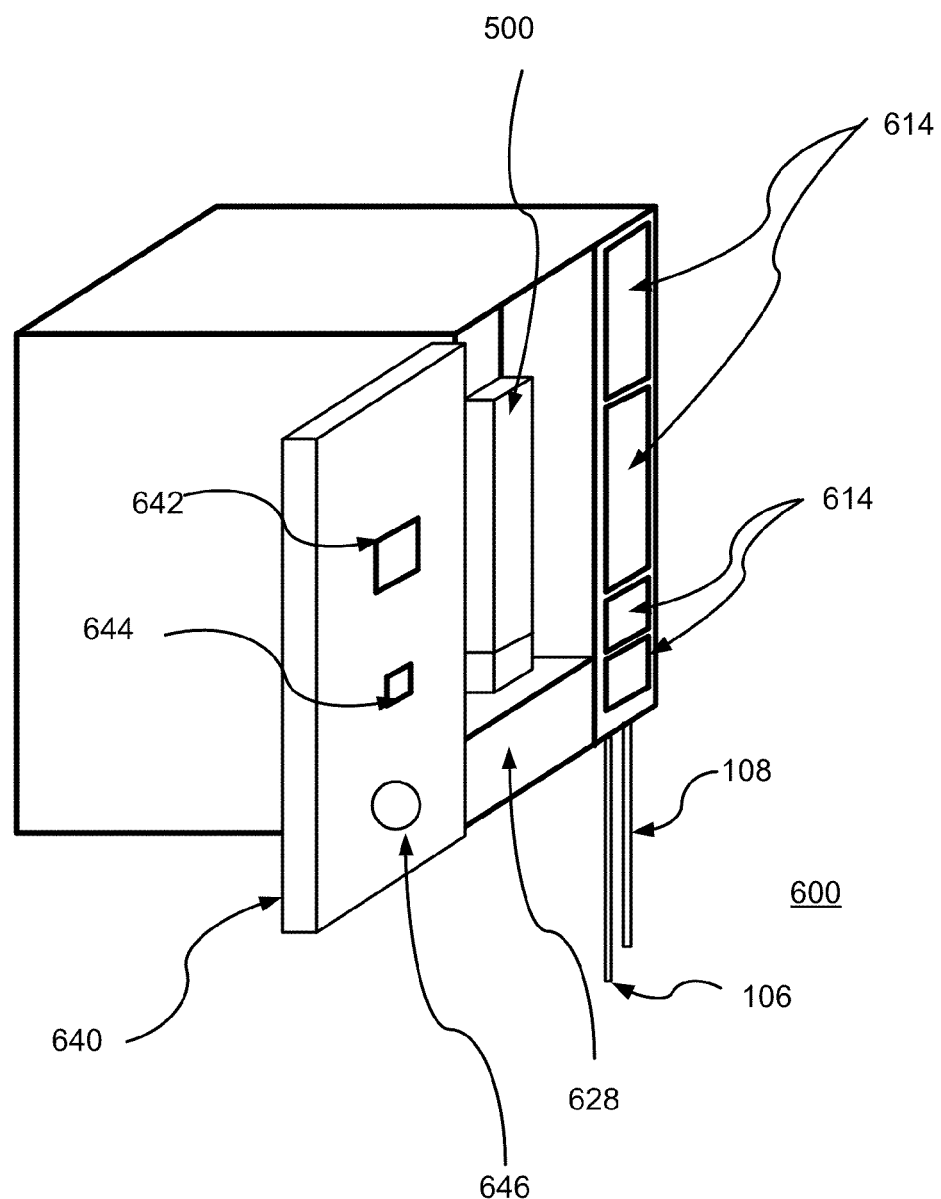
FIG. 10 is another perspective view of the cabinet of FIG. 6.
Figure 11:
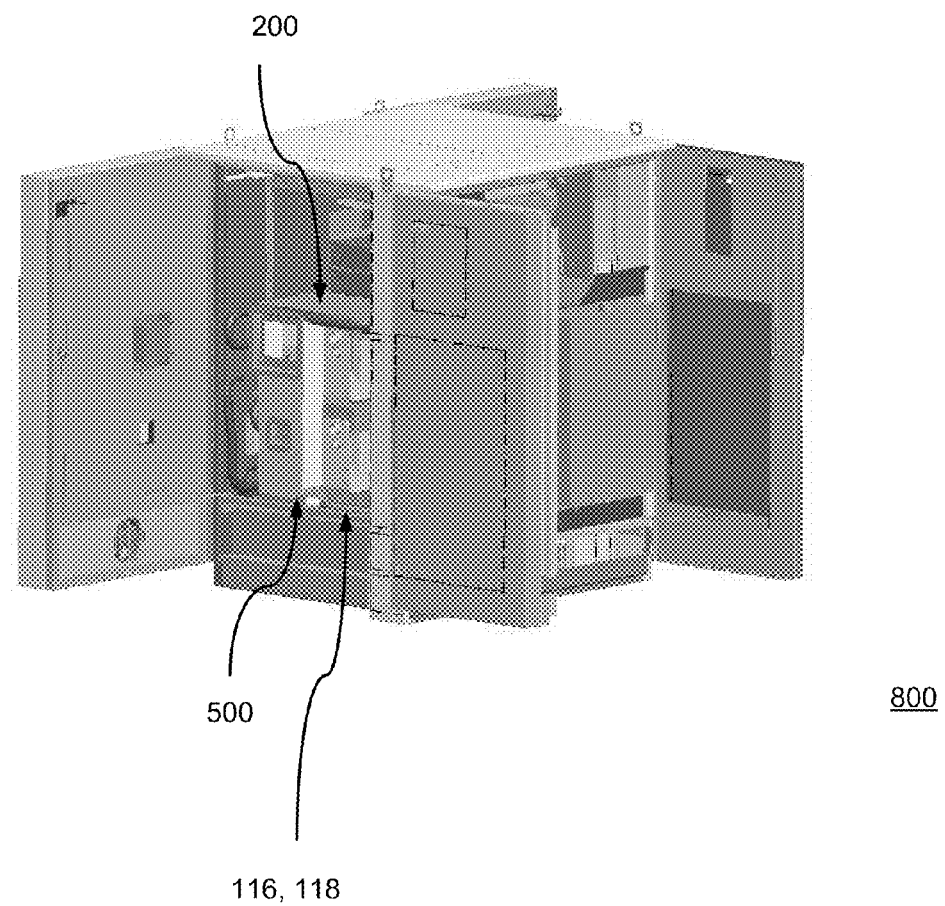
FIG. 11 is a perspective view of a cabinet, according to an embodiment of the invention.
Figure 12:
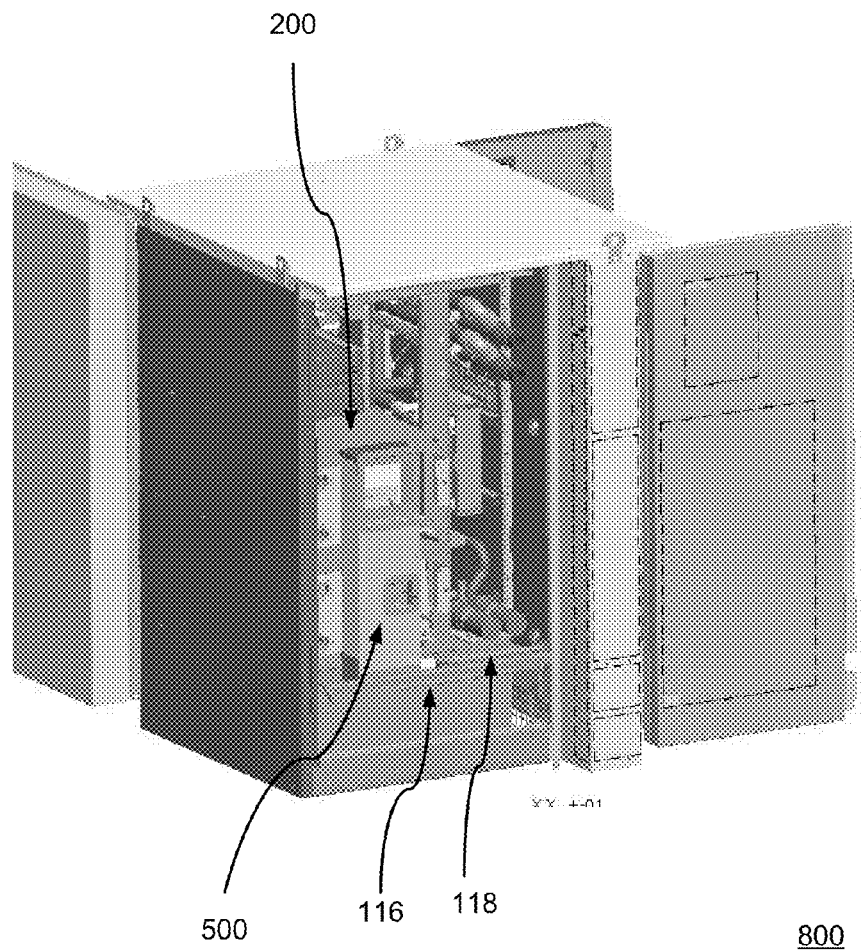
FIG. 12 is another perspective view of the cabinet of FIG. 11.

FIG. 9 shows an aspect of the fuel cell cabinet 600 with the door 640 in a closed position. FIG. 10 shows the fuel cell cabinet 600 with the door 640 in the open position. The door 640 can include a fan system or exhaust system 642, 644, 646.

The plenum 500 can be sealed against the inside surface of the door 640 and can communicate with the fan system or exhaust system 642, 644, 646 of the door 640. The other side of the plenum 500 (not shown in FIG. 10) can be sealed against the plenum sealing collar 204.

The fuel cell cabinet 600 can include air exits 614. In this aspect, a splice chamber can be located behind the air exits 614. The sealed plenum base 512 can collect and manage the flow of the water from the fuel cells 200 to the drain line 106 or 108. In the disclosed exemplary aspect, the drain line 106, 108 can extend through the splice chamber wall and down below the cabinet 600, as shown in FIG. 10. The drain lines 106, 108 can exit from the bottom of the splice compartment into a drain pipe (e.g., 110). In other aspects, a pipe or tube or set of pipes or tubes can connect the plenum 500 to one or more the drain lines 106, 108. In other aspects, one or more drains lines 106, 108 can be combined into a single drain line downstream.

Referring again to FIG. 3A, the drain pipe 110 can extend through the concrete pad 102 and into the gravel 103. The drain pipe 110 can be configured to extend below the frost line 114. In this aspect, the waste water management system can recycle the clean, pure water from the fuel cells 200 back into the surrounding environment.

Referring again to FIG. 3B, in other aspects the waste water management system can collect, store, or supply the clean, pure water from the fuel cells to a device for other uses. For example, the system can include a container 120 for collecting the clean pure water located within the interior of the fuel cell cabinet. In other aspects, a container 130 can be located outside the fuel cell cabinet (shown by dashed lines). In another aspect, a container (not shown) can be disposed under the fuel cell cabinet, such as an underground water tank. In other aspects, the clean, pure water can be pumped to a water tank above grade for storage or collection at a later time, or for supplying water supply needs for another device or use.

Another exemplary aspect of a fuel cell cabinet 800 having a waste water management system will now be described with reference to FIGS. 11-15. One of ordinary skill in the art will recognize that the aspects are not limited to the particular arrangement of elements shown in FIGS. 11-15, and other arrangements can be provided within the spirit and scope of the present invention.

Figure 13:
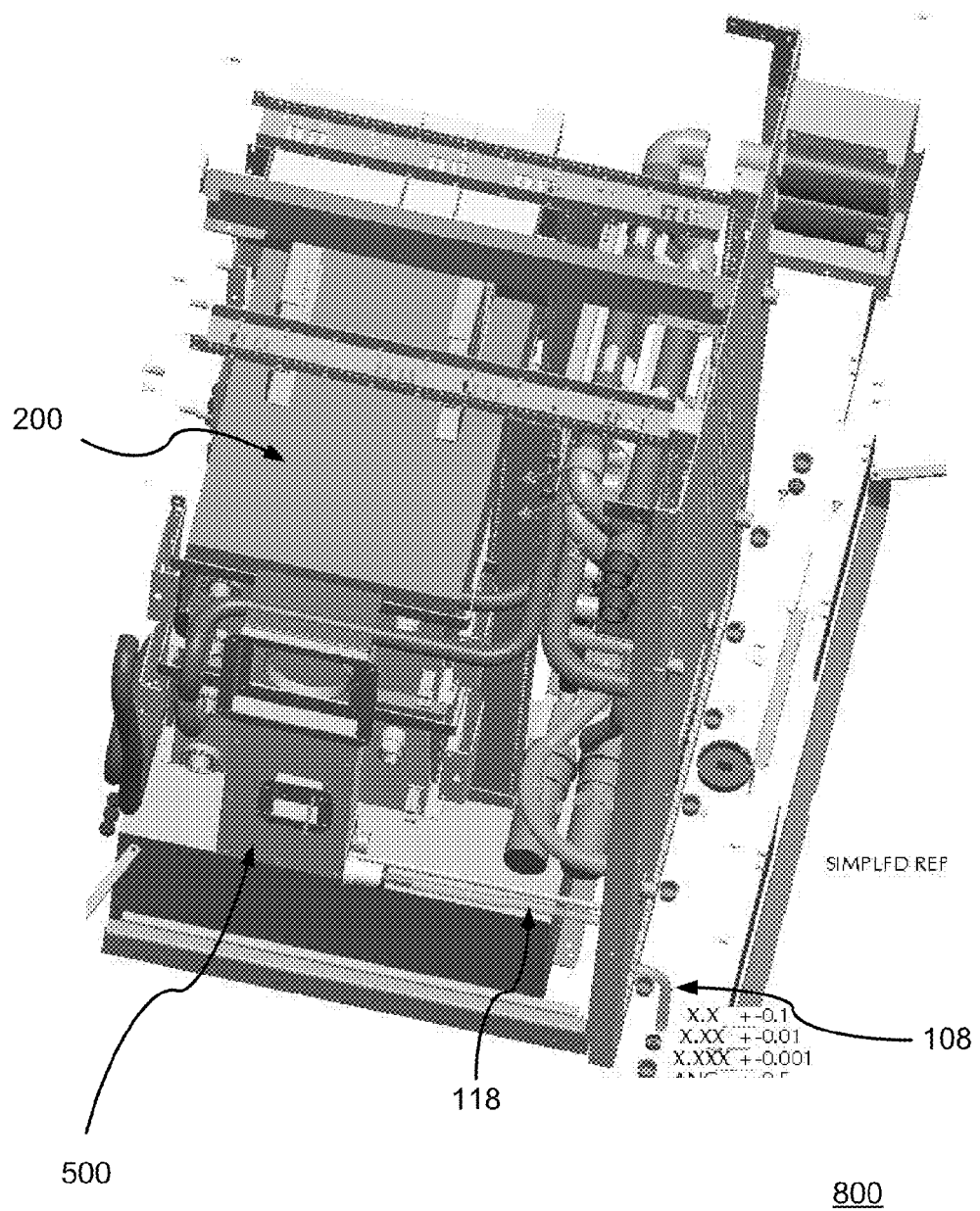
FIG. 13 is another perspective view of the cabinet of FIG. 11.
Figure 14:
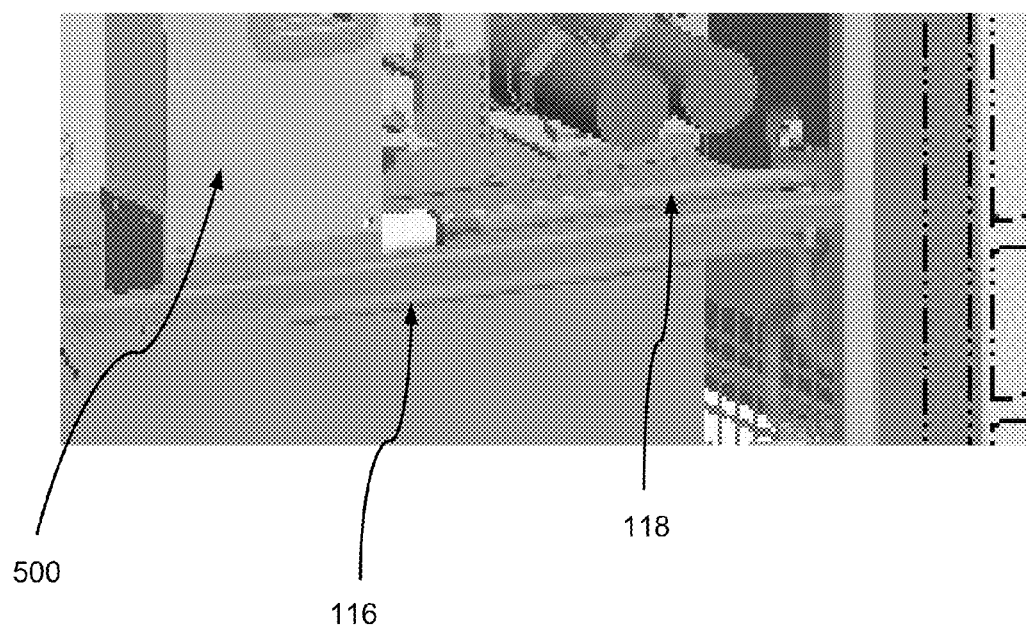
FIG. 14 is a partial, perspective view of a cabinet, according to an embodiment of the invention.
Figure 15:
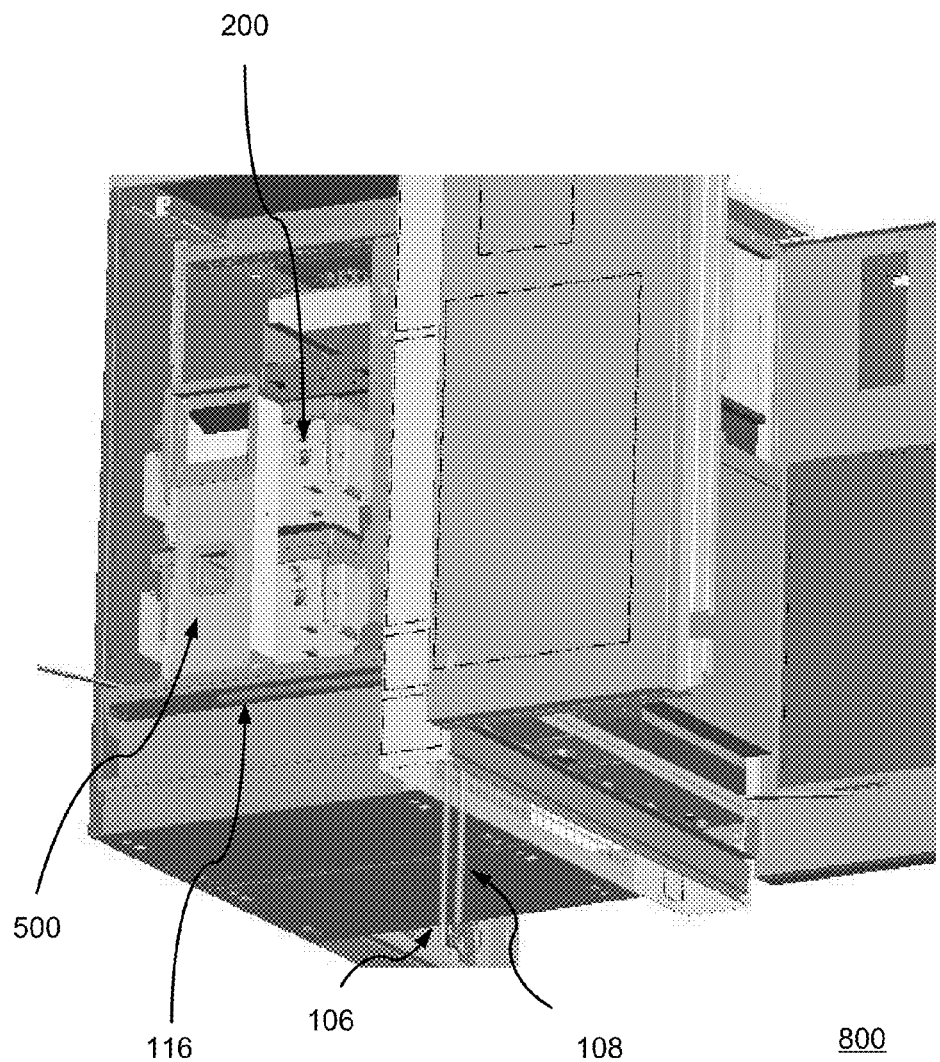
FIG. 15 is another perspective view of the cabinet of FIG. 11.

In this aspect, one or more drain tubes 116, 118 can extend from the plenum fittings 514, 516 and connect to the drain lines 106, 108, for example, inside the splice chamber, as shown in FIGS. 13-15. The drain tubes 116, 118 alternatively can connect to the drain lines 106, 108 inside the interior of the cabinet before passing through the splice chamber wall.

In operation, the sealed plenum base of plenum 500 collects and manages the flow of the water from the fuel cells 200 through the drain tubes 116, 118 to the drain lines 106, 108. The drain tubes 116, 118 or the drain lines 106, 108 extend through the splice chamber wall and down below the cabinet 800. The drain lines 106, 108 can exit from the bottom of the splice compartment into a drain pipe (not shown). In another aspect, a pipe or tube or set of pipes or tubes can connect the plenum 500 to the drain lines 106, 108. In other aspects, the drains lines 106, 108 can be combined into a single drain line.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto. Furthermore, although elements of the invention may be described or claimed in the singular, the plural is contemplated unless limitation to the singular is explicitly stated.

What is claimed is:

1. A cabinet comprising:
    electronic equipment housed within said cabinet, wherein said electronic equipment is for connection to subscriber lines or provider lines; and
    a fuel cell power backup system for providing backup power to said electronic equipment in the case of a power failure, wherein said fuel cell power backup system is contained in an interior of said cabinet and wherein said fuel cell power backup system includes:
    a fuel cell disposed inside said cabinet for generating the backup power; and
    a waste water management system attached to said fuel cell,
    wherein said waste water management system manages a flow of water from said fuel cell to one of a container outside of said cabinet and an area within the ground beneath a mounting surface supporting said cabinet.

2. The cabinet according to claim 1, wherein said waste water management system manages the flow of water from said fuel cell to said area within the ground, and wherein said area is located directly beneath said mounting surface supporting said cabinet.

3. The cabinet according to claim 1, wherein said waste water management system includes a plenum having a sealed base that collects and manages the flow of the water from said fuel cell.

4. The cabinet according to claim 3, wherein said plenum includes one or more sealed drain fittings that receive one or more drains lines for managing the flow of the water from said plenum.

5. The cabinet according to claim 3, further comprising:
    one or more drain lines coupled to said plenum, wherein said one or more drain lines manages the flow of the water to said one of the container and said area within the ground.

6. The cabinet according to claim 5, wherein said one or more drain lines manages the flow of the water to said area within the ground, and wherein said area is located directly beneath said mounting surface supporting said cabinet.

7. The cabinet according to claim 6, further comprising:
    a drain pipe extending through said mounting surface to said area within the ground.

8. The cabinet according to claim 7, wherein a top of said drain pipe is at or above said mounting surface.

9. The cabinet according to claim 7, wherein said mounting surface is formed over a gravel base.

10. The cabinet according to claim 7, wherein a bottom of said drain pipe extends below a frost line.

11. The cabinet according to claim 10, wherein said mounting surface is a horizontal concrete pad.

12. The cabinet according to claim 10, wherein at least a portion of said drain pipe below the frost line is perforated.

13. The cabinet according to claim 10, wherein said one or more drain lines extend into an interior space of said drain pipe.

14. The cabinet according to claim 7, wherein said one or more drain lines extend into an interior space of said drain pipe.

15. The cabinet according to claim 5, wherein said one or more drain lines are insulated drain lines.

16. The cabinet according to claim 5, further comprising:
    a heater that heats said one or more drain lines.

17. The cabinet according to claim 1, wherein said waste water management system manages the flow of water from said fuel cell to said container outside of said cabinet.

18. The cabinet according to claim 17, wherein said container collects and stores the water, and
    wherein said fuel cell reuses the water for cooling or hydrogen regeneration.

19. A cabinet comprising:
    electronic equipment housed within said cabinet, wherein said electronic equipment is for connection to subscriber lines or provider lines; and
    a fuel cell power backup system for providing backup power to said electronic equipment in the case of a power failure, wherein said fuel cell power backup system is contained in an interior of said cabinet and wherein said fuel cell power backup system includes:
    a fuel cell disposed inside said cabinet for generating the backup power; and
    a waste water management system attached to said fuel cell,
    wherein said cabinet is supported from below by a pad, and wherein said waste water management system includes a pipe or hose which permits water from said fuel cell to flow into the ground beneath said pad supporting said cabinet.

20. The cabinet according to claim 19, wherein the water from said pipe or hose exits into an area within the ground residing below a frost line.

21. The cabinet according to claim 19, wherein said pipe or hose penetrates said pad such that the water from said fuel cell pass into a portion of the ground directly beneath said pad supporting said cabinet.

22. The cabinet according to claim 21, wherein said pad is formed of concrete.

23. The cabinet according to claim 19, wherein said pipe or hose is insulated to prevent the water in said pipe or hose from freezing.

24. The cabinet according to claim 19, wherein said pipe or hose is heated to prevent the water in said pipe or hose from freezing.

25. The cabinet according to claim 24, wherein said pipe or hose is heated by a heater attached thereto.

26. The cabinet according to claim 24, wherein said pipe or hose is heated by a fan blowing heated air over said pipe or hose.

27. The cabinet according to claim 19, further comprising:
a plenum sealed to said fuel cell to exhaust said fuel cell to an exterior of said cabinet, wherein said waste water management system is attached to said fuel cell via said plenum.

28. A cabinet comprising:
electronic equipment housed within said cabinet, wherein said electronic equipment is for connection to subscriber lines or provider lines; and
a fuel cell power backup system for providing backup power to said electronic equipment in the case of a power failure, wherein said fuel cell power backup system is contained in an interior of said cabinet and wherein said fuel cell power backup system includes:
a fuel cell disposed inside said cabinet for generating the backup power;
a plenum sealed to said fuel cell to exhaust said fuel cell to an exterior of said cabinet; and
a waste water management system attached to said fuel cell via said plenum,
wherein said plenum is connected to at least one pipe or hose at a lower end of said plenum, which permits water from said fuel cell which accumulates in said lower end of said plenum to flow to another location.

29. The cabinet according to claim 28, wherein said plenum is sealed against an inside surface of a door of said cabinet.

30. The cabinet according to claim 29, wherein said plenum communicates with a fan system installed in said door to exhaust said fuel cell to the exterior of said cabinet.

31. The cabinet according to claim 28, wherein said cabinet is supported from below by a pad, and wherein said pipe or hose permits water from said fuel cell to flow into the ground beneath said pad supporting said cabinet and into an area within the ground residing below a frost line.

32. The cabinet according to claim 31, wherein said pipe or hose penetrates said pad and wherein said area within the ground resides directly below said pad.

33. The cabinet according to claim 28, wherein said pipe or hose permits water from said fuel cell to flow to a container.

34. The cabinet according to claim 33, wherein said container collects and stores the water, and wherein said fuel cell reuses the water for cooling or hydrogen regeneration.

* * * * *